United States Patent
Yoon et al.

(10) Patent No.: US 11,267,710 B2
(45) Date of Patent: Mar. 8, 2022

(54) METHOD FOR PRODUCING CARBON NANOTUBE DISPERSION WITH IMPROVED WORKABILITY

(71) Applicant: LG CHEM, LTD., Seoul (KR)

(72) Inventors: Jae Keun Yoon, Daejeon (KR); Dong Hyun Cho, Daejeon (KR); Sung Jin Kim, Daejeon (KR); Kyung Yeon Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/331,796

(22) PCT Filed: Jan. 5, 2018

(86) PCT No.: PCT/KR2018/000251
§ 371 (c)(1),
(2) Date: May 15, 2019

(87) PCT Pub. No.: WO2018/128461
PCT Pub. Date: Jul. 12, 2018

(65) Prior Publication Data
US 2019/0263663 A1    Aug. 29, 2019

(30) Foreign Application Priority Data
Jan. 5, 2017  (KR) .................. 10-2017-0001673

(51) Int. Cl.
*C01B 32/174*    (2017.01)
*C01B 32/176*    (2017.01)
*C01B 32/158*    (2017.01)

(52) U.S. Cl.
CPC .......... *C01B 32/174* (2017.08); *C01B 32/158* (2017.08); *C01B 32/176* (2017.08);
(Continued)

(58) Field of Classification Search
CPC ....... B82B 3/00; C01B 32/174; C01B 32/176; C01B 2202/28; C01B 2202/32
(Continued)

(56) References Cited

U.S. PATENT DOCUMENTS

2012/0058889 A1    3/2012   Nishino et al.
2013/0337707 A1   12/2013   Hata et al.
(Continued)

FOREIGN PATENT DOCUMENTS

CN    105074966 A    11/2015
JP    2006-315893 A  11/2006
(Continued)

OTHER PUBLICATIONS

Tucho, et al. :"The effects of ball milling intensity on morphology of multiwall carbon nanotubes", Elsevier, Scripta Materialia, vol. 63, 2010, pp. 637-640.
(Continued)

*Primary Examiner* — Khanh T Nguyen
(74) *Attorney, Agent, or Firm* — Dentons US LLP

(57) ABSTRACT

In the present invention, by dry pulverizing carbon nanotubes to control wettability index of the carbon nanotubes, the maximum concentration of the carbon nanotubes that can be added to the dispersion solvent can be increased and the workability of the carbon nanotube dispersion can be improved. Further, from this, it is possible to more easily predict the maximum concentration of the carbon nanotubes that can be added to the dispersion solvent.

17 Claims, 1 Drawing Sheet

(52) U.S. Cl.
CPC ...... *C01B 2202/28* (2013.01); *C01B 2202/32* (2013.01); *C01B 2202/34* (2013.01); *C01P 2006/11* (2013.01); *C01P 2006/22* (2013.01)

(58) Field of Classification Search
USPC .......................................................... 429/217
See application file for complete search history.

(56) References Cited

U.S. PATENT DOCUMENTS

| | | | |
|---|---|---|---|
| 2016/0020466 | A1 | 1/2016 | Ulbrich et al. |
| 2016/0362300 | A1 | 12/2016 | Debski et al. |
| 2018/0016146 | A1 | 1/2018 | Hata et al. |

FOREIGN PATENT DOCUMENTS

| | | |
|---|---|---|
| JP | 5034544 B2 | 9/2012 |
| JP | 2013-230951 A | 11/2013 |
| JP | 2014-131960 A | 7/2014 |
| JP | 2016-514080 A | 5/2016 |
| KR | 10-0793259 B1 | 1/2008 |
| KR | 10-1024169 B1 | 3/2011 |
| KR | 10-2011-0124764 A | 11/2011 |
| KR | 10-1218366 B1 | 1/2013 |
| KR | 10-2013-0053015 A | 5/2013 |
| KR | 10-1365456 B1 | 2/2014 |
| KR | 10-1471044 B1 | 12/2014 |
| KR | 10-2015-0090831 A | 8/2015 |
| KR | 10-2015-0122653 A | 11/2015 |

OTHER PUBLICATIONS

Krause, et al. :"Influence of dry grinding in a ball mill on the length of multiwalled carbon nanotubes and their dispersion and percolation behaviour in melt mixed polycarbonate composites", Elsevier, Composites Science and Technology, vol. 71, 2011, pp. 1145-1153.

METHOD FOR PRODUCING CARBON NANOTUBE DISPERSION WITH IMPROVED WORKABILITY

This application is a national phase entry of PCT/KR2018/000251 having an international filing date of Jan. 5, 2018, and claims the benefit of priority to Korean Patent Application No. 10-2017-0001673, filed on Jan. 5, 2017, the entire disclosure of which is incorporated herein by reference.

FIELD

The present invention relates to a carbon nanotube dispersion with improved dispersibility and a method for producing same.

BACKGROUND

Description of the Related Art

Carbon nanotubes exhibit non-conducting, conducting, or semiconducting properties depending on their specific chirality and have carbon atoms connected by a strong covalent bond. Therefore, the tensile strength of a carbon nanotube is about 100 times greater than that of steel. Carbon nanotubes are excellent in flexibility and elasticity and have chemically stable characteristics. Due to such size and specific physical properties, carbon nanotubes are industrially important in the production of composites and have high utility in the fields of electronic materials, energy materials and others. For example, carbon nanotubes may be applied to an electrode of an electrochemical storage device such as a secondary cell, a fuel cell or a super capacitor, an electromagnetic wave shield, a field emission display, or a gas sensor.

However, due to low density of bulk carbon nanotubes and dusting in processing due to the several tens to several hundreds of microns size of powder form, it may be harmful to human body and cause malfunction of an electric appliance. In addition, there is a difficulty in dispersing carbon nanotubes due to a big difference in apparent density between pellets and the polymer in a powder form to be mixed.

In order to efficiently exhibit high electrical conductivity and thermal conductivity of carbon nanotubes, it is advantageous that the length of a carbon nanotube is longer because the network is formed better. However, when the carbon nanotubes are too long, the viscosity of matrix increases rapidly when the carbon nanotubes are used as a filler.

Particularly, when bundle-type carbon nanotubes are dispersed in a solvent, the carbon nanotubes are easily loosened and the initial viscosity increases rapidly, which makes the dispersing process impossible.

There is an attempt to reduce a viscosity of a carbon nanotube dispersion by adjusting the length of the carbon nanotubes in advance. Generally, a dry or wet pulverizing process is used. In the case of wet pulverization, the pulverization process is carried out in the presence of a treating solvent, so that an additional process of removing the used solvent is required. In addition, in the case of dry pulverization, an additive is used, so that the additive acts as an impurity and it is troublesome to remove it.

There is a need for a method capable of improving the dispersibility of the carbon nanotubes in a dispersion solvent and improving the workability in manufacturing a carbon nanotube dispersion by using a simpler process.

SUMMARY

An object of the present invention is to provide a method for producing carbon nanotubes with improved dispersibility in a dispersion medium.

Another object of the present invention is to provide a carbon nanotube dispersion with improved workability by controlling viscosity.

In order to solve the problems of the present invention, there is provided a carbon nanotube dispersion in which carbon nanotubes having a wettability index of 14 or less as defined by the following Formula 1, and in an amount of 2 wt. % or more based on the total weight of the dispersion, are dispersed.

Wettability index=(mass of absorbed solvent/mass of carbon nanotubes) [Formula 1]

In the formula 1, the mass of absorbed solvent is the mass of the solvent absorbed to the maximum extent by the carbon nanotubes at room temperature.

According to one embodiment, a viscosity of the dispersion may be 40,000 cP or less.

According to one embodiment, the dispersion may comprise one or more dispersion solvent selected from water, methanol, ethanol, propanol, acetone, dimethylformamide (DMF), dimethylacetamide, dimethyl sulfoxide (DMSO) and N-methylpyrrolidone (NMP).

The present invention also provides a method for producing a carbon nanotube dispersion, comprising the steps of: dry pulverizing carbon nanotubes in a milling apparatus including metal or ceramic balls; and dispersing the pulverized carbon nanotubes in a solvent.

According to one embodiment, the wettability index of the carbon nanotubes after the pulverization step may be reduced by 3 or more compared to the wettability index of the carbon nanotubes before the pulverization.

According to one embodiment, the carbon nanotubes may have a bulk density of 10 to 250 kg/m$^3$, a BET specific surface area of 100 to 300 m$^2$/g and a length of 5 to 100 μm before the pulverization.

According to one embodiment, the pulverized carbon nanotubes may have a length of 0.2 to 10 μm. According to one embodiment, the metal or ceramic balls may be one kind of balls having a diameter in a range of 1 mm to 10 mm, or a combination of two or more kinds of balls having different diameters in the above range.

According to one embodiment, the milling apparatus may be selected from a ball mill, a planetary ball mill and an attrition mill.

According to one embodiment, the length of the carbon nanotubes after the pulverization step may be reduced to 1/10 or less.

According to one embodiment, the specific surface area of the carbon nanotubes after the pulverization step may be increased by 5% to 100%.

According to one embodiment, the bulk density of the carbon nanotubes after the pulverization step may be increased by 5% to 1000%.

According to one embodiment, in the step of pulverizing by the milling apparatus, the milling speed may be controlled between 100 rpm and 1,200 rpm.

According to one embodiment, the pulverizing step may be performed for 5 minutes to 24 hours.

Effect of the Invention

The present invention can provide carbon nanotubes in which carbon nanotubes are dry pulverized and cut in advance before main dispersing process and a wettability of the carbon nanotubes with respect to a dispersion solvent is controlled, so that the increase in viscosity during the dispersing process is suppressed and the dispersibility in a solvent is improved. Also, the content of carbon nanotubes dispersible in a solvent can be increased without any other additives such as dispersants. In addition, the process according to the invention can be used to some extent to easily predict the maximum content that can be dispersed in a solvent.

DETAILED DESCRIPTION

Figure 1:
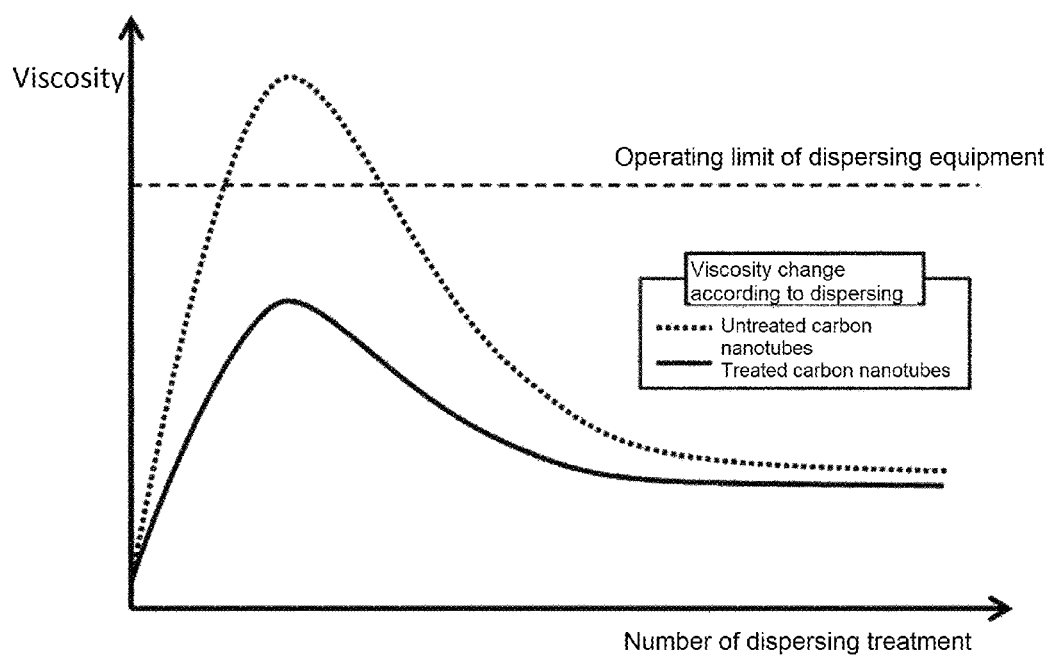
FIG. 1 is a graph showing the viscosity change of a dispersion according to the number of dispersing treatment.

The terms and words used in the present specification and claims should not be construed as limited to ordinary or dictionary terms and should be construed as meaning and concept consistent with the technical idea of the present invention based on the principle that the inventor can properly define the concept of the term to describe its invention in the best possible way.

Carbon nanotubes can exhibit conducting or semiconducting properties, and have excellent mechanical properties such as tensile strength. Therefore, they are used in various applications. One of the most important techniques for application of such carbon nanotubes is a dispersion of carbon nanotubes.

Carbon nanotubes are slightly variable depending on the dispersing equipment to be used. However, generally, during the dispersing process, the size of the carbon nanotube particles decreases, the individual carbon nanotube strands come loose, and the viscosity increases greatly. The higher the viscosity, the less the efficiency of the dispersing equipment and, depending on the situation, the equipment may be no longer remain operational. This can become a big obstacle when producing high concentration solutions, which may limit application fields. This phenomenon occurs more rapidly in bundle-type carbon nanotubes, which are currently widely used, and becomes an obstacle to the application of carbon nanotubes.

In order to solve the problems of the present invention, there is provided a carbon nanotube dispersion in which carbon nanotubes having a wettability index of 14 or less with respect to the solvent for the carbon nanotube dispersion, which are obtained by cutting in a milling apparatus including metal or ceramic balls, are dispersed in an amount of 2 wt % or more based on the total weight of the dispersion, and a method for producing the same.

In the present invention, the number, length, and surface of the carbon nanotube strands can be changed by pulverizing and cutting in advance before dispersing the carbon nanotubes in the dispersion medium, thereby adjusting their wettability index with respect to the solvent and improving the workability.

Herein, the wettability index is defined as the maximum mass of the solvent when the solvent is absorbed by a certain mass of carbon nanotubes so that it is not allowed to flow out to the outside. Specifically, a solvent is gradually added to a container containing a certain amount of carbon nanotubes at ambient temperature. The mass of the solvent is measured immediately before the solvent begins to flow out, because once the solvent begins to flow out the carbon nanotubes no longer absorb the solvent. The wettability index means the numerical value calculated by the following formula 1.

Wettability index=(mass of absorbed solvent/mass of carbon nanotubes)  [Formula 1]

The smaller the wettability index of the carbon nanotubes, the smaller the amount of solvent absorbed by the carbon nanotubes. The lower the index, the more the increase in viscosity at the time of dispersion is suppressed, and the dispersibility of the carbon nanotubes can be improved. According to the present invention, the carbon nanotubes pre-milled by high-speed milling has a significantly lower wettability index than that of the carbon nanotubes before being pulverized, and thus the degree of dispersion in the dispersion solvent can be remarkably increased.

For example, when the dispersion medium is N-methylpyrrolidone (NMP), the wettability index may be preferably 14 or less, preferably 12 or less, and more preferably 10 or less. In the case of other solvents than NMP, it is preferable to exhibit the same or similar numerical values.

The dispersion medium may be any one selected from water, methanol, ethanol, propanol, acetone, dimethylformamide (DMF), dimethylacetamide, dimethyl sulfoxide (DMSO) and N-methylpyrrolidone (NMP), or a mixed solvent of two or more of them.

Further, when the wettability index satisfies the above range, the maximum dispersible concentration of the carbon nanotubes may be 2 wt. % or more. The dispersible concentration means the weight percentage of the carbon nanotubes in the total weight of the dispersion (carbon nanotubes dispersed in the dispersion medium).

The carbon nanotube dispersion according to the present invention may contain carbon nanotubes, for example but not limited to, in an amount of 10 wt % or less based on the total weight of the dispersion.

The viscosity of the dispersion may be 40,000 cP or less, preferably 20,000 cP or less, and more preferably 10,000 cP or less. The viscosity of the dispersion may be inclusive of the viscosity of the final dispersion and the viscosity of the dispersion during the process. However, the viscosity of the final dispersion may be less than the viscosity of the dispersion during the process.

According to one embodiment, the wettability index of the carbon nanotube after the pulverization step may be reduced by 3 or more, and preferably 4 or more, compared with the wettability index of the carbon nanotube before the pulverization.

Preferably, the wettability index and the maximum dispersible concentration of the carbon nanotubes may satisfy the following formula 2.

$$1+3.75/\{1+e^{\hat{}}[(X-9)/1.005)]\} \leq Y \leq 2.2+3.75/\{1+e^{\hat{}}[(X-9)/1.005)]\}$$  [Formula 2]

In the formula 2, X is the wettability index of the carbon nanotube, provided that X≤14, and Y is the maximum dispersible concentration of the carbon nanotube, "e" is a Euler-Mascheroni constant, and "^" refers to squares.

According to another aspect of the present invention, it is easier to determine the dispersible concentration by measuring the wettability index. For example, by simply measuring the wettability index of a small amount of carbon nanotubes without directly mixing a large amount of carbon nanotubes in a dispersion solvent, it is possible to predict the maximum concentration at which the pulverized carbon nanotubes can be mixed.

According to one embodiment, the carbon nanotubes may have a bulk density of 10 to 250 kg/m$^3$, a BET specific surface area of 100 to 300 m$^2$/g and a length of 5 to 100 μm, before pulverization. Carbon nanotubes having such physical properties may have an excellent effect of improving the wettability index. In addition, the carbon nanotube may be an entangled or bundled, multi-wall or single-wall carbon nanotubes, but preferably it may be a bundled multi-wall carbon nanotubes.

The average length of the carbon nanotubes which are pulverized and cut in the milling apparatus may be 0.2 to 10 μm. Alternatively, the carbon nanotubes may have the average length of 5 to 100 μm before the pulverizing and cutting, and may have the length reduced by 1/10 or more, with respect to the initial length of carbon nanotube, after the pulverizing and cutting process. Reducing the length of the carbon nanotubes by 1/10 or more helps improve the workability of the carbon nanotube dispersion.

The workability of the carbon nanotube dispersion mainly depends on the viscosity of the dispersion. Such viscosity is mainly affected by the number and length of the carbon nanotube strands contained in the dispersion, and the interaction of the carbon nanotubes and the dispersant with the solvent. Generally, as the long strands of carbon nanotube are loosened at the initial stage of dispersion, the viscosity may be greatly increased and the workability may be lowered. FIG. 1 is a graph showing the viscosity change of a dispersion according to the number of dispersing treatment. This deterioration in workability can be more noticeable in bundle-type carbon nanotubes of a relatively long length in which carbon nanotube strands are easily loosened.

Referring to FIG. 1, it can be seen that if the carbon nanotubes are pre-treated by the pulverizing method according to the present invention, the increase in viscosity during the dispersion step can be suppressed, and the final viscosity is also lowered. Therefore, if the length is reduced in advance through pulverization, that is, from the method in which pulverization and cutting are carried out in advance, it is possible to significantly reduce the increase in viscosity during the dispersion to improve the workability and lower the viscosity of the finally produced dispersion, thereby providing a carbon nanotube dispersion containing a higher concentration of carbon nanotubes.

The carbon nanotubes that have undergone the pulverizing and cutting processes can be significantly reduced in length, as well as increased in density. Such an increase in density can provide not only the effect of improving the dispersibility in the solvent and reducing the viscosity of the dispersion but also improvement of transportation efficiency and workability. In addition, the density is increased to reduce the phenomenon of scattering, thereby improving the manufacturing environment and stability. Further, it is possible to obtain the effect that impurity introduction due to scattering is reduced and the defect rate is lowered.

According to one embodiment, the bulk density of the carbon nanotubes before the pulverizing and cutting process can be 10 to 250 kg/m$^3$ or 10 to 100 kg/m$^3$.

The bulk density can be remarkably increased due to reduction in the length of the carbon nanotubes and the loosening of the carbon nanotube strands after the pulverizing and cutting process. Preferably, the bulk density may be increased by 5% to 1000% within the range of 50 to 400 kg/m$^3$, for example by 10% to 500%, or by 50% to 300%. As described above, since the bulk density of the carbon nanotubes is increased, the viscosity of the dispersion gradually increases, so that the dispersion can be made easier and the carbon nanotubes having a higher solid content can be dispersed.

According to one embodiment, the specific surface area of the carbon nanotubes before the pulverizing and cutting process may be 100 to 300 m$^2$/g, or 150 m$^2$/g to 300 m$^2$/g.

The specific surface area (BET specific surface area) of the carbon nanotubes may be increased due to reduction in diameter of the strand to be loosened and mechanical defects during the pulverizing and cutting process, for example by 5% to 100%. Increasing the BET specific surface area in this range can contribute to improving the wettability index.

According to one embodiment, the carbon nanotubes may be of a bundle type or an entangled type. In the pulverizing and cutting process, for the bundle-type carbon nanotubes it is easier to control the loosening and the length of the strands.

The term 'bundle' used in the present invention refers to a bundle or a rope form in which a plurality of carbon nanotubes are arranged or intertwined in parallel, unless otherwise specified. The term 'non-bundle or entangled' means a form that does not have a constant shape, such as a bundle or a rope.

The bundle-type carbon nanotubes basically have a shape in which a plurality of carbon nanotube strands are bundled together to form a bundle, and the plurality of strands have a linear shape, a curved shape, or a mixed shape thereof. The bundle-type carbon nanotubes may also have a linear shape, a curved shape, or a mixed shape thereof. Finally, these bundles of carbon nanotubes are also gathered together to form carbon nanotube particles ranging from several tens of μm to as large as several millimeters.

According to one embodiment, such aggregates of bundle-type carbon nanotubes may have a length of 5 to 100 μm and a thickness of 0.1 to 20 μm. The average diameter of the carbon nanotube strand may be, for example, 1 nm to 40 nm. Carbon nanotubes having such physical properties can be excellent in improving the wettability index.

In the present invention, by controlling the wettability index together with the control of the length of the carbon nanotube, it is possible to deal with the case where the dispersibility may be changed by various parameters other than the length that can be changed by the pulverizing process. Therefore, the pulverizing process can be performed more efficiently. For example, it is possible to roughly predict the dispersible concentration, without evaluating the physical properties such as the length, density and BET specific surface area, and thereby the efficiency of the process can be improved.

According to one embodiment, the milling apparatus used in the pulverizing and cutting process may be any milling apparatus using metal or ceramic balls. For example, a ball mill or a jar mill, a planetary ball mill and an attrition mill may be used.

The ball used in the milling apparatus may be of a metal or a ceramic material. For example, a metal containing tungsten (W), titanium (Ti) or an alloy thereof, or a ceramic material such as zirconia ($ZrO_2$), alumina ($Al_2O_3$), and silica ($SiO_2$) may be used, but is not limited thereto. If necessary, balls of two or more materials may be mixed and used.

According to one embodiment, the metal or ceramic balls may be one kind of balls having a diameter of 1 mm to 10 mm, preferably 1 mm to 8 mm, or 1 mm to 6 mm or less, or a combination of two or more kinds of balls having different diameters in the above range. If balls having different diameters are mixed, balls having a diameter of 1 mm to 3 mm or less and balls having a diameter of from more than 3 mm to 10 mm or less may be used. The mixing ratio thereof may be from 90:10 to 10:90 or from 70:30 to 30:70 or from 60:40 to 40:60 by weight. The shape of the ball is generally spherical, but is not limited thereto, and non-spherical balls such as cylindrical balls may also be used. When the size and mixing ratio of the balls are in the above range, it is easy to simultaneously control the wettability index and the bulk density of the carbon nanotubes to a specific range.

According to one embodiment, the ball and the carbon nanotube may be added in a weight ratio of 1:10 to 1:200, or 1:50 to 1:150 or 1:100 to 1:150. The carbon nanotube having an appropriate length may be obtained in the weight ratio range. If the balls are excessively used with respect to the carbon nanotubes, the length or the shape of the carbon nanotubes may be excessively deformed, which may deteriorate the physical properties of the carbon nanotubes. Also wear of walls of the container and balls may occur more severely and the maintenance cost may increase. On the other hand, if the carbon nanotubes are excessively used, the pulverizing and cutting may not be efficiently performed. The weight ratio can be adjusted according to the manufacturing conditions such as the size of the balls to be used and the rpm, and the physical properties of the carbon nanotubes such as bulk density of the carbon nanotubes to be used.

According to one embodiment, the rpm of the pulverizing and cutting process using the milling apparatus may be adjusted at 100 to 1,200 rpm in order to improve the wettability index, preferably at 200 to 700 rpm. The rpm can be increased or decreased stepwise by adjusting appropriately.

According to one embodiment, the milling process may be performed for 5 minutes to 24 hours to improve the wettability index, but it may be suitably adjusted according to the rpm, the milling apparatus, and the content of the carbon nanotubes. For example, it may be desirable to perform for 10 minutes to 10 hours in a ball mill or for 10 minutes to 3 hours in an attrition mill. For example, milling may be performed at 400 to 600 rpm for 60 to 90 minutes by using balls having a diameter of 1 to 3 mm, and milling may be performed at 200 to 400 rpm for 90 to 120 minutes by using balls having a diameter of 1 to 3 mm and balls having a diameter of 4 to 6 mm together.

According to the present invention, the step of dry pulverizing carbon nanotubes in advance using the milling apparatus, before the step of dispersing the carbon nanotubes in the liquid dispersion medium, allows not only suppression in the increase in viscosity of the dispersion during the dispersion step, but also to reduce the viscosity of the finally produced dispersion. Thus, it is possible to provide a dispersion containing a higher content of carbon nanotubes without further using other additives such as dispersants.

In addition, since the density of the carbon nanotubes is remarkably increased by the pulverizing and cutting process, the scattering of the carbon nanotubes during the manufacturing process can be remarkably reduced, and the carbon nanotubes can be safely manufactured by the manufacturing process in a more environmentally friendly manner. Moreover, defects which are occurred by inflow of carbon nanotubes into manufactured articles and devices and the like due to the scattering can be reduced, and storage volume can be reduced due to reduction of the apparent density and the like of the carbon nanotubes. Therefore, transportation efficiency and storage stability can be improved and a more efficient manufacturing process can be provided.

The method of dispersing the carbon nanotubes produced by the production method according to the present invention in a liquid dispersion medium may be any method and is not particularly limited.

The carbon nanotube dispersion produced by the method according to the present invention can be usefully used for the production of an electrode of an electrochemical storage device such as a secondary battery, a fuel cell or a super capacitor, an electromagnetic wave shielding material, a field emission display or a gas sensor.

Hereinafter, embodiments of the present invention will be described in detail so that those skilled in the art can easily carry out the present invention. The present invention may, however, be embodied in many different forms and should not be construed as limited to the embodiments set forth herein.

The physical properties in the examples were measured as follows, and all physical properties were measured at ambient temperature.

Bulk density:

Carbon nanotube powders were freely dropped into a 100 cc cylindrical container and the portion protruding from the container was scraped. Then, the mass of the powders remained in the container was obtained. The bulk density was determined by dividing the mass of the powders by the volume of the container.

BET specific surface area:

It was measured from the isothermal gas adsorption pattern obtained using a specific surface area measuring instrument commonly used.

Powder resistivity:

The powders are placed in the measuring cell of the powder resistivity meter used for measuring the powder resistivity and the pressure applied thereto was measured. The pressure-resistivity relationship curve was obtained by using five measuring points around a density of 1 g/cc. From this curve, the powder resistivity at a density of 1 g/cc was obtained.

Wettability index: It is determined from formula 1 using N-methylpyrrolidone (NMP).

$$\text{Wettability index} = (\text{mass of absorbed solvent}/\text{mass of carbon nanotubes}) \quad \text{[Formula 1]}$$

In the formula 1, mass of absorbed solvent is the mass of the solvent absorbed to the maximum extent by the carbon nanotubes at ambient temperature.

Example 1

Bundle-type carbon nanotubes having a bulk density of about 40 kg/m$^3$, a BET specific surface area of 185 m$^2$/g and an average length of 30 μm were milled for 10, 15, 20, 60, and 80 minutes at a speed of 500 rpm in an attrition mill (KMtech, KMA-3) containing zirconia balls having a diameter of 2 mm. Then, the bulk density, the wettability index and the powder resistivity were measured and the results are shown in Table 1. The pulverized carbon nanotubes had a length of 0.2 to 10 μm and a BET specific surface area of 200 to 280 m$^2$/g.

In addition, the viscosity and the maximum concentration that can be dispersed in NMP were measured. The maximum concentration was defined as the highest concentration among the concentrations of solution at which the dispersing equipment (GEA niro soavi, PandaPLUS 2000) can be operated when using the same dispersant and equipment, wherein the concentration is weight percentage of the carbon nanotubes based on the total weight of the dispersion. The viscosity was based on 4 wt % dispersion in NMP.

TABLE 1

| | Treatment time (min) | Bulk density (kg/m$^3$) | Wettability index (NMP/CNT) | Powder resistivity @1 g/cc ($\Omega \cdot$ cm) | Maximum conc. (wt %) | Viscosity (cP) (in NMP, 4%) |
|---|---|---|---|---|---|---|
| Comp. Example 1 | — | 39.9 | 15.6 | 0.0169 | 1.5 | Not dispersible |
| Example 1-1 | 10 | 65.1 | 12.5 | 0.0206 | 4 | 26000 |
| Example 1-2 | 15 | 68.7 | 11.5 | 0.0222 | 4.5 | 8000 |
| Example 1-3 | 20 | 71.7 | 11.3 | 0.0229 | 5 | 7500 |
| Example 1-4 | 60 | 83.7 | 6.5 | 0.0542 | >5 | 950 |
| Example 1-5 | 80 | 97.7 | 5.6 | 0.0566 | >5 | 330 |

Example 2

Bundle-type carbon nanotubes having a bulk density of about 40 kg/m$^3$, a BET specific surface area of 185 m$^2$/g and a length of 30 μm were milled for 60, 80, 100 and 140 minutes at a speed of 300 rpm in an attrition mill containing zirconia balls having a diameter of 3 mm and a diameter of 5 mm. Then, the bulk density, the wettability index and the powder resistivity were measured and the results are shown in Table 2. The pulverized carbon nanotubes had a length of 0.2 to 10 μm and a BET specific surface area of 260 to 280 m$^2$/g.

In addition, the viscosity and the maximum concentration that can be dispersed in NMP were measured. The maximum concentration is weight percentage of the carbon nanotubes based on the total weight of the dispersion.

TABLE 2

| | Treatment time (min) | Bulk density (kg/m$^3$) | Wettability index (NMP/CNT) | Powder resistivity @1 g/cc ($\Omega \cdot$ cm) | Max. conc. (wt %) | Viscosity (cP) (in NMP, 4%) |
|---|---|---|---|---|---|---|
| Comp. Example 1 | — | 39.9 | 15.6 | 0.0169 | 1.5 | Not dispersible |
| Example 2-1 | 60 | 77.9 | 8.8 | 0.0250 | 4 | 10300 |
| Example 2-2 | 80 | 90 | 7.8 | — | 4.5 | 8300 |
| Example 2-3 | 100 | 97.7 | 6.7 | 0.0297 | 5 | 5900 |
| Example 2-4 | 140 | 119.1 | 5.8 | — | 5 | 4300 |

Example 3

Various types such as bundle-type or entangled carbon nanotubes having a bulk density of 13 to 90 kg/m$^3$, a BET specific surface area of 150 to 270 m$^2$/g and a length of 10 to 40 μm were milled for 16 hours at a speed of 130 rpm in a ball mill (DS-BM10L, manufactured by DongSeo Science Co., Ltd.) containing zirconia balls having a diameter of from 3 to 10 mm or for 10 minutes to 2 hours at a speed of 200 to 900 rpm in an attrition mill. The wettability index and the maximum concentration that can be dispersed in NMP were measured and the results are shown in Table 3.

TABLE 3

| Ex. | Bundle/ Entangled | Bulk density (kg/m$^3$) before pulverization | Bulk density (kg/m$^3$) after pulverization | Wettability index (NMP/CNT) | Max. Conc. (wt %) | Apparatus | Diam. of ball |
|---|---|---|---|---|---|---|---|
| 3-1 | Mixed | 86 | 118 | 4.8 | 5 | Ball mill | 10 mm/3 mm |
| 3-2 | Bundle | 24 | 156 | 6.3 | 5 | Attrition mill | 5 mm |
| 3-3 | Bundle | 30 | 89 | 7 | 4.75 | Ball mill | 10 mm/3 mm |
| 3-4 | Bundle | 24 | 139 | 7.7 | 5 | Attrition mill | 5 mm |

TABLE 3-continued

| Ex. | Bundle/ Entangled | Bulk density (kg/m³) before pulverization | Bulk density (kg/m³) after pulverization | Wettability index (NMP/CNT) | Max. Conc. (wt %) | Apparatus | Diam. of ball |
|---|---|---|---|---|---|---|---|
| 3-5 | Mixed | 53 | 91 | 7.7 | 4.25 | Ball mill | 10 mm/3 mm |
| 3-6 | Bundle | 24 | 139 | 7.8 | 4.5 | Attrition mill | 5 mm |
| 3-7 | Mixed | 30 | 92 | 8.1 | 3.75 | Ball mill | 10 mm/3 mm |
| 3-8 | Mixed | 41 | 88 | 8.6 | 4 | Ball mill | 10 mm/3 mm |
| 3-9 | Bundle | 29 | 80 | 9.2 | 3.25 | Ball mill | 10 mm/3 mm |
| 3-10 | Bundle | 36 | 73 | 9.2 | 2.75 | Ball mill | 10 mm/3 mm |
| 3-11 | Bundle | 15 | 82 | 9.3 | 3.25 | Ball mill | 10 mm/3 mm |
| 3-12 | Bundle | 41 | 73 | 9.9 | 2.5 | Ball mill | 10 mm/3 mm |
| 3-13 | Bundle | 50 | 72 | 10.3 | 2.5 | Ball mill | 10 mm/3 mm |
| 3-14 | Bundle | 24 | 89 | 13.2 | 2.25 | Attrition mill | 5 mm |

Figure 2:
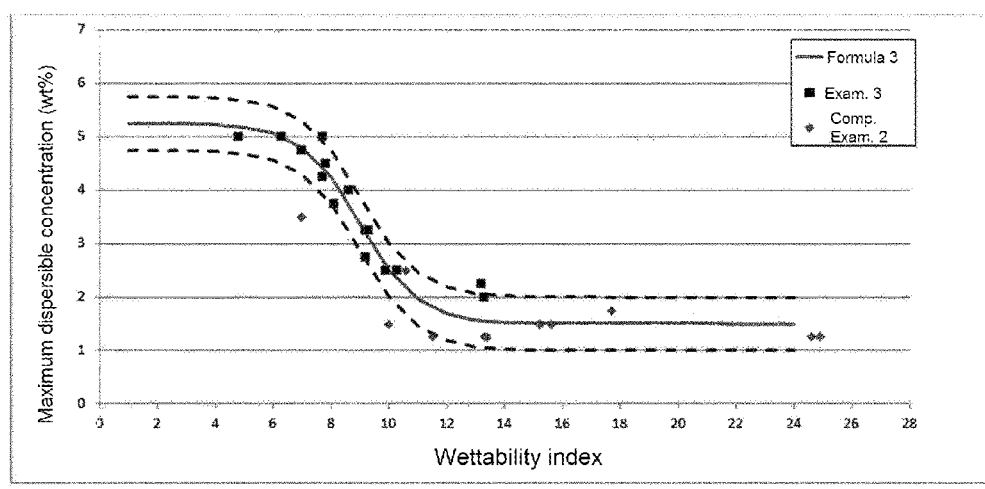
FIG. 2 is a graph showing the relationship between wettability index of carbon nanotubes and maximum dispersible concentration in a dispersion solvent.

FIG. 2 is a graph showing the relationship between the wettability index and the maximum concentration based on the data in Table 3. As shown in Table 3 and FIG. 2, it can be seen that the wettability index and the maximum concentration satisfy the following formula 3.

$$Y=1.5+3.75/\{1+e^{\hat{}}[(X-9)/1.005)]\} \quad \text{[Formula 2]}$$

In the formula 3, X is the wettability index of the carbon nanotube, and Y is the maximum dispersible concentration of the carbon nanotube.

Comparative Example 2

The wettability index and the maximum concentration that can be dispersed in NMP for the carbon nanotubes which were not subjected to the milling treatment were measured and the results are shown in Table 4.

TABLE 4

| Comparative Example | Bundle/ Entangled | Bulk density (g/L) | Wettability index (NMP/CNT) | Maximum concentration (wt %) |
|---|---|---|---|---|
| 2-1 | Mixed | 30 | 15.2 | 1.5 |
| 2-2 | Bundle | 30 | 15.6 | 1.5 |
| 2-3 | Bundle | 29 | 17.7 | 1.75 |
| 2-4 | Bundle | 15 | 24.6 | 1.25 |
| 2-5 | Bundle | 21 | 24.9 | 1.25 |

Comparative Example 3

The carbon nanotubes used in Comparative Example 2 were pulverized for 20 minutes by using a jet mill (KMtech), and the wettability index and the maximum concentration that can be dispersed in NMP were measured and the results are shown in Table 5.

TABLE 5

| Comparative Example | Bundle/ Entangled | Bulk density (g/L) | Wettability index (NMP/CNT) | Maximum concentration (wt %) |
|---|---|---|---|---|
| 3-1 | Mixed | 15 | 22.3 | 1.25 |
| 3-2 | Bundle | 13 | 25.2 | 1.25 |
| 3-3 | Bundle | 12 | 27 | 1 |
| 3-4 | Bundle | 7.4 | 29.8 | 0.75 |
| 3-5 | Mixed | 5.1 | 32.4 | 0.75 |

As shown in FIG. 1 and Tables 4 and 5, it can be seen that carbon nanotubes which were not milled or which were treated with a jet mill have a high wettability index and a very low maximum dispersible concentration.

While the present invention has been particularly shown and described with reference to specific embodiments thereof, it will be apparent to those skilled in the art that this specific descriptions is merely a preferred embodiment and that the scope of the invention is not limited thereby. It is therefore intended that the scope of the invention be defined by the claims appended hereto and their equivalents.

What is claimed is:

1. A carbon nanotube dispersion in which dry-pulverized carbon nanotubes having a wettability index of 14 or less as defined by Formula 1 are dispersed in a solvent in an amount of 2 wt % or more based on a total weight of the dispersion:

Wettability index=(mass of absorbed solvent/mass of carbon nanotubes)    [Formula 1]

wherein, the mass of absorbed solvent is a mass of the solvent absorbed to a maximum extent, where the carbon nanotubes no longer absorb the solvent, by the dry-pulverized carbon nanotubes at ambient temperature, and wherein the dry-pulverized carbon nanotubes have a bulk density of 65.1 kg/m³ or greater.

2. The carbon nanotube dispersion according to claim 1, wherein a viscosity of the dispersion is 40,000 cP or less.

3. The carbon nanotube dispersion according to claim 1, wherein the dispersion comprises one or more dispersion media selected from one or more of: water, methanol, ethanol, propanol, acetone, dimethylformamide (DMF), dimethylacetamide, dimethyl sulfoxide (DMSO) or N-methylpyrrolidone (NMP).

4. A method for producing a carbon nanotube dispersion comprising the steps of:

dry pulverizing carbon nanotubes in a milling apparatus including metal or ceramic balls in order to produce dry-pulverized carbon nanotubes having a wettability index reduced by 3 or more compared to the wettability index of the carbon nanotubes before the dry pulverizing, wherein the wettability index is defined by Formula 1:

Wettability index=(mass of absorbed solvent/mass of carbon nanotubes)    [Formula 1]

wherein, the mass of absorbed solvent is a mass of the solvent absorbed to a maximum extent, where the carbon nanotubes no longer absorb the solvent, by the dry-pulverized carbon nanotubes at ambient temperature; and dispersing the dry-pulverized carbon nanotubes in a solvent.

5. The method for producing the carbon nanotube dispersion according to claim 4, wherein the carbon nanotubes have a BET specific surface area of 100 to 300 m²/g and a length of 5 to 100 μm before the dry pulverizing.

6. The method for producing the carbon nanotube dispersion according to claim 4, wherein the carbon nanotubes have a length of 0.2 to 10 μm after the dry pulverizing.

7. The method for producing the carbon nanotube dispersion according to claim 4, wherein the metal or ceramic balls are one kind of balls having a diameter of 1 mm to 10 mm, or a combination of two or more kinds of balls having different diameters of 1 mm to 10 mm.

8. The method for producing the carbon nanotube dispersion according to claim 4, wherein the milling apparatus is selected from: a ball mill, a planetary ball mill or an attrition mill.

9. The method for producing the carbon nanotube dispersion according to claim 4, wherein the length of the carbon nanotubes after the dry pulverizing step is reduced to 1/10 or less.

10. The method for producing the carbon nanotube dispersion according to claim 4, wherein the specific surface area of the carbon nanotubes after the dry pulverizing step is increased by 5% to 100%.

11. The method for producing the carbon nanotube dispersion according to claim 4, wherein the bulk density of the carbon nanotubes after the dry pulverizing step is increased by 5% to 1000%.

12. The method for producing the carbon nanotube dispersion according to claim 4, wherein in the step of dry pulverizing by the milling apparatus, a milling speed is 100 rpm to 1,200 rpm.

13. The method for producing the carbon nanotube dispersion according to claim 4, wherein the dry pulverizing step is performed for 5 minutes to 24 hours.

14. The method for producing the carbon nanotube dispersion according to claim 4, wherein the carbon nanotubes have a bulk density of 65.1-119.1 kg/m³.

15. The method for producing the carbon nanotube dispersion according to claim 4, wherein the metal or ceramic balls are one kind of balls having a diameter of 1 mm to 10 mm, or a combination of two or more kinds of balls having different diameters of 1 mm to 10 mm;
    wherein the balls and the carbon nanotubes are added to the milling apparatus in a weight ratio of 1:10 to 1:200;
    wherein the milling apparatus is operated at 100 to 1,200 rpm; and
    wherein the dry pulverizing is performed for 5 minutes to 24 hours.

16. The method for producing the carbon nanotube dispersion according to claim 4, wherein dry pulverizing is performed in the milling apparatus at 400 to 600 rpm, for 60 to 90 minutes, using balls having a diameter of 1 to 3 mm.

17. The method for producing the carbon nanotube dispersion according to claim 4, wherein dry pulverizing is performed in the milling apparatus at 200 to 400 rpm, for 90 to 120 minutes, using a combination of balls having a diameter of 1 to 3 mm and balls having a diameter of 4 to 6 mm.

* * * * *